(12) United States Patent
Westra

(10) Patent No.: US 7,162,798 B2
(45) Date of Patent: Jan. 16, 2007

(54) PORTED ENGINE CYLINDER LINER WITH SELECTIVELY LASER-HARDENED AND INDUCTION-HARDENED BORE

(75) Inventor: Mitchell K. Westra, Plainfield, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 499 days.

(21) Appl. No.: 10/787,420

(22) Filed: Feb. 26, 2004

(65) Prior Publication Data

US 2005/0188537 A1 Sep. 1, 2005

(51) Int. Cl.
*B23K 26/00* (2006.01)
*C21D 1/09* (2006.01)
*C21D 1/42* (2006.01)

(52) U.S. Cl. ............... 29/888.061; 148/565; 148/567; 219/121.6

(58) Field of Classification Search ........... 29/888.061; 219/121.6; 148/565, 566, 567, 639
See application file for complete search history.

(56) References Cited

U.S. PATENT DOCUMENTS 4,017,708 A * 4/1977 Engel et al. ................ 148/565
4,093,842 A   6/1978 Scott ................... 219/121 LM
4,393,821 A * 7/1983 Urano ..................... 123/195 C

FOREIGN PATENT DOCUMENTS

| JP | 60-251222 | * | 12/1985 |
| JP | 60-260769 | * | 12/1985 |
| JP | 61-060818 | * | 3/1986 |
| JP | 7004303   | * | 1/1995 |

* cited by examiner

Primary Examiner—Eric Compton
(74) Attorney, Agent, or Firm—Cook, Alex, McFarron, Manzo, Cummings & Mehler, Ltd.

(57) ABSTRACT

Selective laser and induction hardening are applied to areas of a water jacketed engine cylinder liner to provide improved resistance to scuffing resulting from the rubbing contact of the walls and piston rings of an associated piston. An upper bore portion and port relief areas of the liner are fully induction hardened to improve wear resistance. The port area is then fully laser hardened to improve wear resistance. If desired, the laser hardening process may continue beyond the intake port area to the port relief areas to ensure full hardening of the port relief areas and continuous hardening between the intake ports and the port relief areas to improve wear resistance.

6 Claims, 2 Drawing Sheets

PORTED ENGINE CYLINDER LINER WITH SELECTIVELY LASER-HARDENED AND INDUCTION-HARDENED BORE

TECHNICAL FIELD

This invention relates to internal combustion engines and, more particularly, to selective hardening of engine cylinder bores to improve resistance to scuffing and wear.

BACKGROUND OF THE INVENTION

Water jacketed cylinder liners having annularly spaced air inlet ports intermediate their ends are known in the internal combustion engine art. Such liners are commonly made from an alloy cast iron having a medium hardness, as cast, in the range of from about 200 to 260 Brinell. It is also known in such liners to provide a diametrically relieved area of the bore at the ports and extending axially on either side thereof. This port relief area is smoothly curved and blended into the upper and lower liner bores and helps reduce scuffing originating in the port areas and resulting from the rubbing contact in service of the walls of an associated piston and its rings with the cylinder liner bore and port area.

Various other methods have been employed to reduce cylinder liner scuffing. One such method for improving a cylinder liner to reduce scuffing involves plating the cylinder liner with a hard material such as chromium. However, this method is not generally desired because of cost.

Another method of improving a cylinder liner to reduce scuffing involves laser hardening scuff prone surfaces of the bore. However, since lasers are commonly focused into a small diameter beam, the laser must make multiple passes or closed helical passes over the surface of the bore to adequately heat and fully harden the scuff prone surfaces of the bore. As a result, laser hardening is a costly and time consuming method.

Another method of improving a cylinder liner to reduce scuffing involves induction hardening scuff prone surfaces of the bore. Induction hardening uses an electromagnetic coil, which rapidly heats adjacent surfaces of the bore to a hardening temperature. However, when a coil is used around the intake ports and the relieved areas of the cylinder bore, the varying dimensions and geometry of the intake ports and the relieved areas can create difficulties in the hardening process, in that the portions of the bore nearest the coil heat at a faster rate than the portions of the bore farthest from the coil. As a result, the surfaces farthest from the coil may not reach hardening temperature, causing inconsistencies in the quality of the heated surfaces.

SUMMARY OF THE INVENTION

The present invention provides a method utilizing a combination of laser and induction hardening to more efficiently provide a cylinder bore surface resistant to bore scuffing in a water jacketed cylinder liner for a two stroke-cycle diesel engine having annularly disposed air inlet ports with blended port relief areas adjacent the ports.

In an exemplary embodiment, a cylinder liner is cast of an iron alloy. The cylinder liner includes a generally cylindrical cast iron body defining a generally cylindrical interior wall with a plurality of radially extending ports through the cylindrical interior wall and spaced annularly therearound to form a port area intermediate opposite ends of the interior wall.

The cylinder liner is then machined to create upper and lower bore portions respectively above and below an annular band at and extending slightly above and below the port area. The annular band is formed having a slightly greater diameter than that of the upper and lower bore portions to blend the greater diameter of the of the port area into the slightly smaller diameter bore portions, thereby forming upper and lower blended port relief areas between the bore portions and the intake port area.

After the cylinder liner is machined, the cylinder liner undergoes a hardening process according to the method of the present invention. The method includes an induction hardening step and a laser hardening step.

The induction hardening step involves heating the surface of the upper cylinder bore and the upper and lower blended port relief areas to a hardening temperature using electromagnetic induction. The heated surfaces are then cooled to ambient temperature to create a scuff resistant hardened surface in the upper bore area and the blended port relief areas without significant distortion of the cast iron cylinder liner body and its previously machined surfaces.

The laser hardening step is performed primarily to harden the intake port area. The laser hardening process locally heats the intake port area to a hardening temperature by traversing a laser beam across the inner surface of the intake port area in a closed helical pattern. After the laser adequately heats the intake port area to a desired hardening temperature, the intake port area is allowed to cool to ambient temperature to create a scuff resistant hardened surface on the intake port area without significant distortion of said cast iron cylinder liner body and its previously machined surfaces.

Alternatively, the laser hardening step may be expanded to include traversing the laser beam from the intake port area to the upper and/or lower port relief areas to ensure continuous hardening of the annular band.

These and other features and advantages of the invention will be more fully understood from the following description of certain specific embodiments of the invention taken together with the accompanying drawings.

DESCRIPTION OF THE PREFERRED EMBODIMENT

Figure 1:
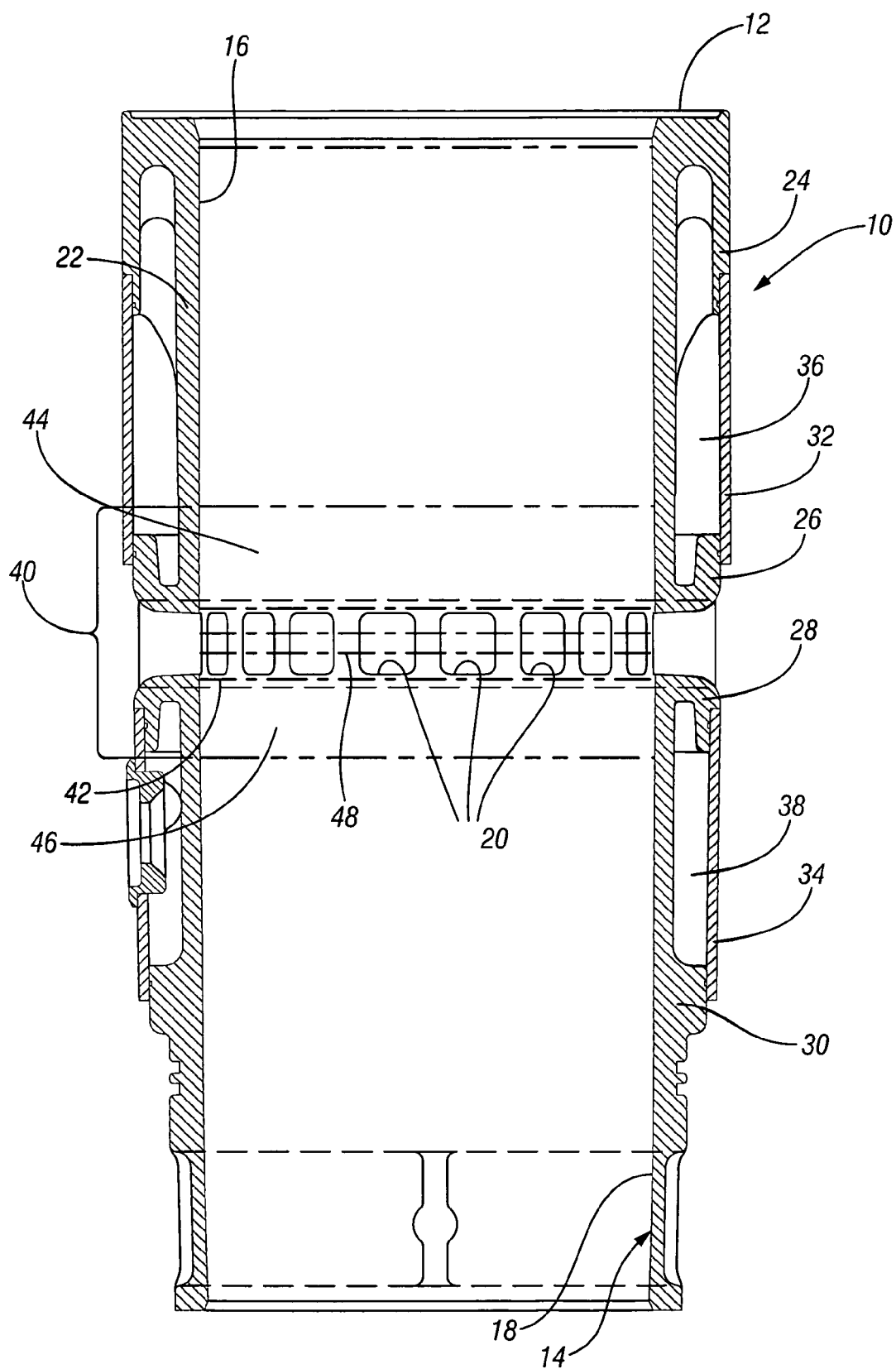
FIG. 1 is a cross-sectional view of a cast water jacketed ported cylinder liner having the cylinder bore selectively case hardened by a combination of induction and laser hardening in accordance with the present invention.

Referring now to FIG. 1 of the drawings in detail, numeral 10 generally indicates a removable cylinder liner of a type used in certain well-known two-cycle diesel engines that are used in numerous applications, including the propulsion of railway locomotives, except for the cylinder bore hardening process, which will be subsequently described. The liner 10 includes a generally cylindrical cast iron body 12 defining internally an elongated generally cylindrical bore 14 having upper and lower bore portions 16, 18, respectively, separated intermediate the ends by an annular row of generally rectangularly spaced air inlet ports 20.

The liner body 12 includes a generally cylindrical inner wall 22, defining the cylinder bore 14 and a plurality of flanges 24, 26, 28, 30 which extend outwardly from the inner wall and upwardly or downwardly to receive upper and lower closure sleeves 32, 34. The sleeves are brazed to the flanges and cooperate therewith to define upper and lower annular cooling jackets 36, 38 surrounding the inner walls 22 adjacent the upper and lower bore portions 16, 18 of the liner 10. The cooling jackets 36, 38 provide for coolant flow through the lower and upper jackets and between the ports for cooling the liner 10 during engine operation.

While the described embodiment of cylinder liner 10 includes brazed on cooling jacket sleeves, it should be understood that the method of the present invention is also applicable to other forms of coolant jacketed, ported cylinder liners having cast iron bores, including fully cast liners.

The cylinder liner 10 is machined to create upper and lower bore portions 16, 18 respectively above and below an annular band 40 at and extending slightly above and below an intake port area 42 defining the inlet ports 20. The annular band 40 is formed having a slightly greater diameter than that of the upper and lower bore portions 16, 18 to provide diametral relief at the port area 42. The diameter of annular band 40 varies to blend the greater diameter of the of the port area 42 into the slightly smaller diameters of the upper and lower bore portions 16, 18, thereby forming upper and lower blended port relief areas 44, 46 between the bore portions and the intake port area 42.

The present invention improves the liner 10 by providing a method, which increases the hardness of the upper bore 16 and the annular band 40 after the liner has been fully machined to provide a scuff resistant surface thereon.

The cylinder liner 10 undergoes a case hardening method, which involves a combination of induction hardening and laser hardening to create a scuff resistant surface in the upper bore 16 and the annular band 40. One step of the hardening process utilizes an electromagnetic induction coil or other known induction devices to heat the upper bore 16 and the blended port relief areas 44, 46 of the liner 10. The coil traverses the bore 14 of the liner 10 for a period of time to adequately heat by inductance the upper bore 16 and the blended port relief areas 44, 46. Once these areas are locally heated to a hardening temperature, the coil is removed from the bore 14. The heated surfaces are then cooled to ambient temperature to create a scuff resistant hardened surface on the upper bore area 16 and blended port relief areas 44, 46.

In an additional step, the intake port area 42 is laser hardened to create a scuff resistant case hardened inner surface in the intake port area. In particular, the intake port area 42 of the liner 10 is fully case hardened through localized heating and ambient cooling of the surface. The heating is accomplished by a traversed laser beam, which is moved along the liner surface in a combination of orbital and axial motion to form a helical pattern 48 covering the intake port area 42. As the laser beam heats the surface to a hardening temperature, the laser is advanced in a helical pattern 48 to allow the heated surface to cool to ambient temperature. Thus, a scuff resistant hardened surface is provided in the intake port area 42 without significant distortion of the cast iron cylinder liner body and its previously machined surfaces. To provide complete hardening of the intake port area, the hardened bands formed by traversing the laser beam over the surface are edge-connected by providing a closed helix without spaces between the hardened bands. With this pattern, the full surface of the intake port area 42 may be hardened in a single pass of the laser beam across the surface.

Figure 2:
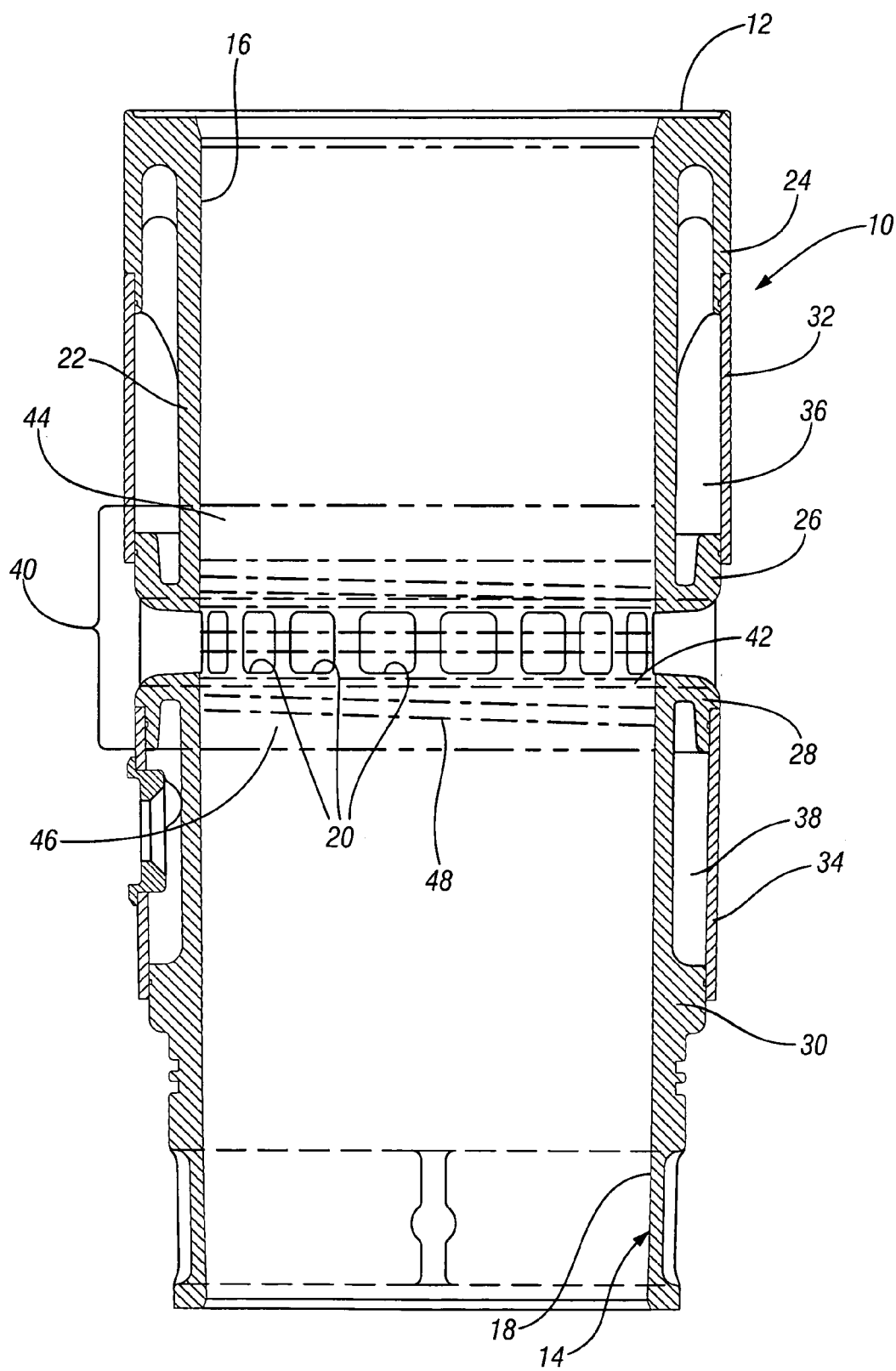
FIG. 2 is a cross-sectional view similar to FIG. 1 but showing an alternative embodiment of the cylinder liner in which the selective hardening processes are overlapped between the induction hardened portion and the laser hardened portion of the cylinder bore.

Preferably, the laser hardening step is continued beyond the intake port area 42 into the blended port relief areas 44, 46. Advantageously, the closed helical pattern 48 created by the laser beam is extended through one blended port relief area, such as area 44, through the intake port area 42 and the other blended port relief area, such as area 46, as shown in FIG. 2. This overlap insures a continuously hardened surface between the induction hardened surfaces of the blended port relief areas 44, 46 and the laser hardened surface of the intake port area 42.

The percent of overlap needed between the intake port area and the blended port relief areas 44, 46 depends on the effectiveness of the induction coil in heating the larger diameter blended port relief areas. When the upper and lower bores 16, 18 have a diameter substantially similar to the diameter of the blended port relief areas 44, 46, the induction process will be more likely to adequately heat the blended port relief areas and thereby form an adequately hardened surface on the relief areas. In such a case, minimal or no laser hardening may be required to provide a continuously hardened surface between the intake port area 42 and the port relief areas 44, 46, as shown in FIG. 1. However, if the diameter of the blended port relief areas 44, 46 are substantially greater than the diameter of the upper and lower bores 14, 16, the induction process may not adequately heat the larger diameter portions of the port relief areas to provide a fully a sufficiently hardened surface in the relief areas. In this case, the laser hardening step may be extended farther into the blended port relief areas 44, 46 to ensure a fully hardened surface of the port relief areas and a continuously hardened surface between the intake port area 42 and the port relief areas, as shown in FIG. 2.

The resulting liner, after the hardening process, has improved wear characteristics over the prior art in that the surfaces of the upper bore 16 and the annular band 40 are fully case hardened and, thus, more resistant to scuffing.

While initial practice of the method has involved performing the induction hardening step first and the laser hardening step second, it should be understood that the order of these steps could be reversed without departing from the concepts involved in the invention.

If desired, after the hardening process, the hardened surfaces of the liner 10 may be honed to roughen the bore 14 surfaces to provide for proper break-in of the rubbing components during initial engine operation.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of making a scuff resistant engine cylinder liner, said method comprising the steps of:
   providing a coolant jacketed cast iron cylinder liner body defining a generally cylindrical interior wall with a plurality of radially extending ports through said wall and spaced annularly therearound to form a port area intermediate opposite ends of said wall;
   machining said liner body, including the inner surface of said wall, to form approximately cylindrical upper and lower bore portions respectively above and below said port area and an annular band between the bore portions and extending slightly above and below said port area, the annular band including the port area machined with slightly greater inner diameter than that of said upper and lower bore portions and upper and lower port relief areas blending said port area with said upper and lower bore portions;

case hardening the upper bore and at least one portion of the blended port relief areas through induction heating to hardening temperature of said upper bore and the blended port relief areas and subsequent ambient cooling such that a scuff resistant hardened surface is provided in said upper bore area and said at least one portion of the blended port relief areas; and case hardening at least the port area through laser heating of the port area and subsequent ambient cooling such that a scuff resistant hardened surface is provided in said port area.

2. A method as in claim 1 including traversing the laser beam across the port area in a overlapping helical pattern to ensure the formation of a fully hardened surface in the port area.

3. A method as in claim 2 including extending laser hardening into the port relief areas immediately adjacent the intake port area to ensure continuous hardening of the port area and the adjacent relief portions.

4. A method as in claim 1 wherein the upper bore portion and the upper and lower relief areas are induction hardened and the port area is laser hardened.

5. A method as in claim 1 wherein the upper bore portion and the upper and lower relief areas are induction hardened and the port area and the upper and lower relief areas are laser hardened.

6. A method as in claim 1 wherein the upper bore portion and the upper relief area are induction hardened and the port area is laser hardened.

* * * * *